Oct. 13, 1959    F. Z. FOUSE    2,908,114
MOLD GRAB

Filed Dec. 14, 1955    3 Sheets-Sheet 1

INVENTOR
Frederick Z. Fouse
BY
Norman L. Holland
ATTORNEY

Oct. 13, 1959     F. Z. FOUSE     2,908,114
MOLD GRAB
Filed Dec. 14, 1955     3 Sheets-Sheet 2
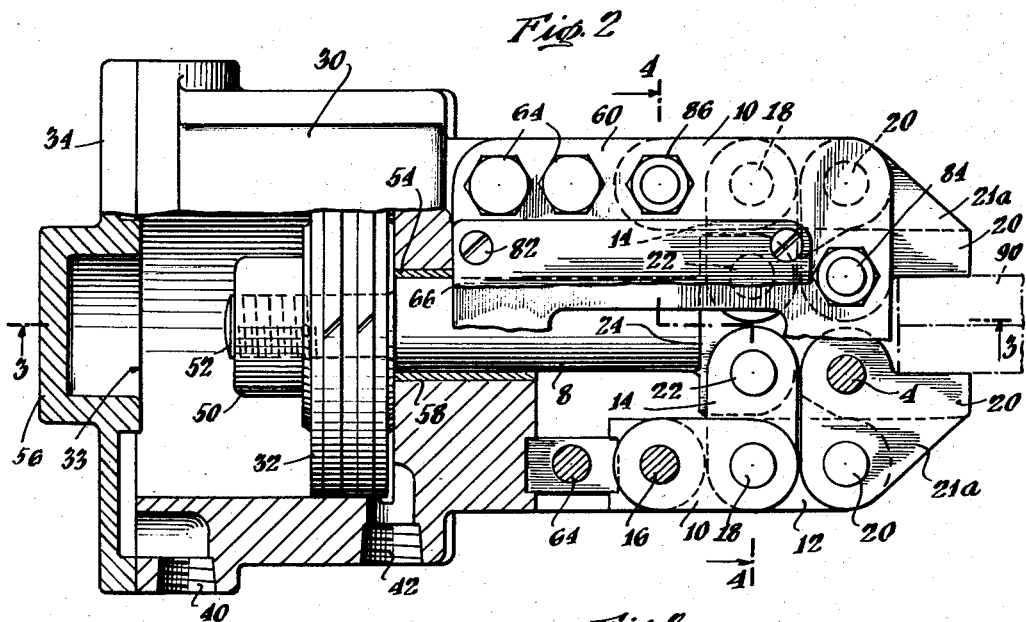
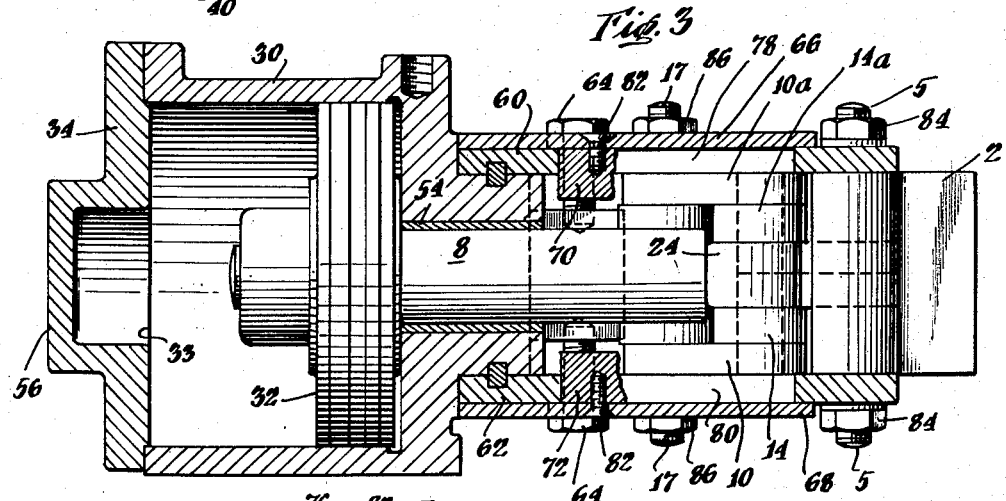
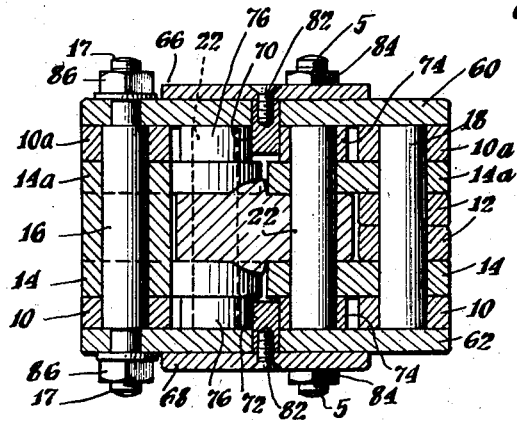
INVENTOR
Frederick Z. Fouse
BY
Norman A. Holland
ATTORNEY Oct. 13, 1959 F. Z. FOUSE 2,908,114
MOLD GRAB
Filed Dec. 14, 1955 3 Sheets-Sheet 3

INVENTOR
Frederick Z. Fouse
BY
Norman L. Holland
ATTORNEY

United States Patent Office 2,908,114
Patented Oct. 13, 1959

2,908,114

MOLD GRAB

Frederick Z. Fouse, Lancaster, Ohio, assignor to Anchor Hocking Glass Corporation, Lancaster, Ohio, a corporation of Delaware Application December 14, 1955, Serial No. 553,049

5 Claims. (Cl. 49—75)

This invention relates to a mold grab for gripping and holding a split mold. The present invention is particularly adapted to be used with a glass machine utilizing a split mold in the manufacture of glass containers. The mold grab of the present invention is adapted to grip the ends of the two mold halves and hold them together while the glass forming operation occurs.

Mold grabs have been devised for use with glass machines; one type grab consists of a pair of gripping jaws which are moved forward while moving toward each other. This type of mold grab tends to push the mold out of line during the molding process, thereby impairing the quality of the molded container, causing excessive wear, and necessitating frequent repair.

Another type of mold grab comprises a pair of jaws mounted in cross-relation to each other to grip the ends of the mold halves by a scissor-like action. This is objectionable because sufficient pressure is not obtainable to hold the mold halves tightly enough to produce a container with a smooth, uniform outer surface, and because it disturbs the mold alignment.

The present invention has for one of its objects a mold grab which has a much greater locking power and which will generate enough pressure to enable the mold to form a container with a smooth uniform outer surface and with a mold parting line of minimum size.

A further object of the present invention is to provide a mold grab which will hold a mold tightly and thereby prevent or restrict the glass from being squeezed out into the joints of the mold.

A further object of the present invention is to provide a mold grab which will not push the mold out of its accurate alignment with the plunger.

A still further object of the present invention is the provision of a mold grab which will reduce the maintenance on the molds, the plungers and rings and which will permit them to operate longer without repair or reconditioning.

Other and further objects of the invention will be obvious upon an understanding of the illustrative embodiment about to be described, or will be indicated in the appended claims, and various advantages not referred to herein will occur to one skilled in the art upon employment of the invention in practice.

In describing this invention, reference will be had to the accompanying drawings wherein like reference characters denote like or corresponding parts thoughout the several figures, and in which:

Fig. 2 is a top view, partly in section, of the mold grab showing the gripping jaws in closed mold-gripping position;

Fig. 3 is a side sectional view taken along line 3—3 of Fig. 2;

Fig. 4 is an end sectional view taken along line 4—4 of Fig. 2;

The mold grab will first be described generally and the specific features will be described under appropriate headings.

GENERAL DESCRIPTION

Figure 6:
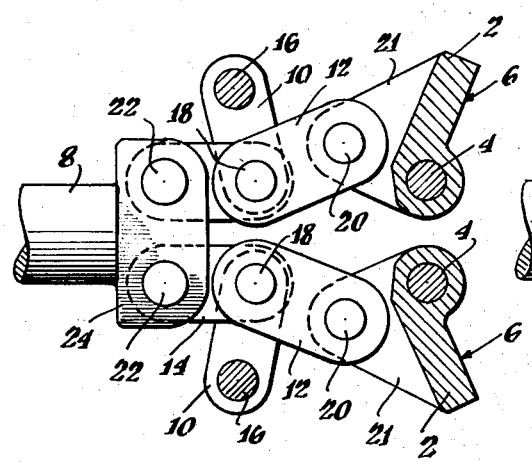
Fig. 6 is a diagrammatic horizontal sectional view of the gripping jaws and the toggles to operate the jaws showing the jaws in the open position.
Figure 7:
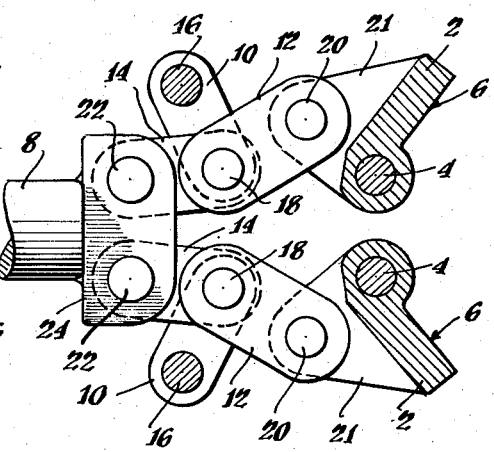
Fig. 7 is a horizontal sectional view similar to Fig. 6 showing the jaws in a position intermediate the open and closed position.
Figure 8:
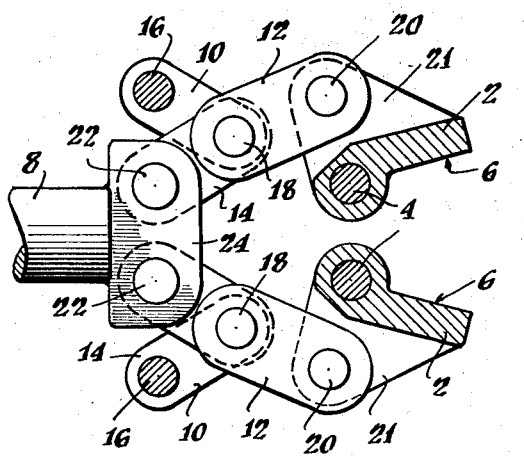
Fig. 8 is a horizontal sectional view similar to Fig. 7 showing the gripping jaws in a more advanced closed position.

Referring more particularly to Figs. 6 to 8 of the drawings, gripping jaws 2 are pivotally mounted on the stationary pivots or pins 4 and have their gripping faces 6 facing each other. The gripping jaws 2 are swung from an open position to a closed gripping position by means of the piston rod 8 through the intermediation of a toggle having toggle arms 10 and 12 and link 14 connecting the rod 8 and the toggle.

The toggle arms 10 have one end pivotally mounted on the pins or pivots 16 stationarily mounted on the frame of the machine and the other end pivotally mounted on the floating pivot 18. The toggle arms 12 have one end pivotally mounted on the pins or pivots 20 on the arms 21 extending from jaws 2 and the other end mounted on the floating pivot 18. The link 14 is pivotally mounted at one end on the pins or pivots 22 on the piston rod extension 24 and at the other end to the floating pivot 18.

The toggle arms 10 and 12 and the links 14 have one end operatively connected together by the floating pivot or pin 18 so that when the links 14 are thrust forward, the toggle arm 12 will be thrust forward and the toggle arms 10 and 12 will become aligned in a straight line position thereby to turn the jaws 2 on the pin 4 to their closed gripping position.

When the jaws 2 are in their open position, the piston rod 8 is in retracted position and the toggle arms 10 and 12 are angled with respect to each other in the manner shown in Fig. 6. When the jaws 2 are to be closed, the piston rod 8 is moved forward to push links 14 forward. Links 14 exert pressure on the floating pivots 18 which move outwardly in a generally curved path. The movement of the floating pivots 18 permits the toggle arms 12 to exert pressure on the jaws 2 and moves the jaws 2 toward their closed gripping position. Under the pressure of the links 14, the floating pivots 18 move from the position shown in Fig. 6 to the position shown in Fig. 9 and the toggle arms 10 and 12 are aligned in the straight-line position shown in Fig. 9 so that the forward movement of pivots 20 on the arms 21 moves the jaws 2 to the closed position shown in Fig. 9.

Actuating mechanism

Figure 5:
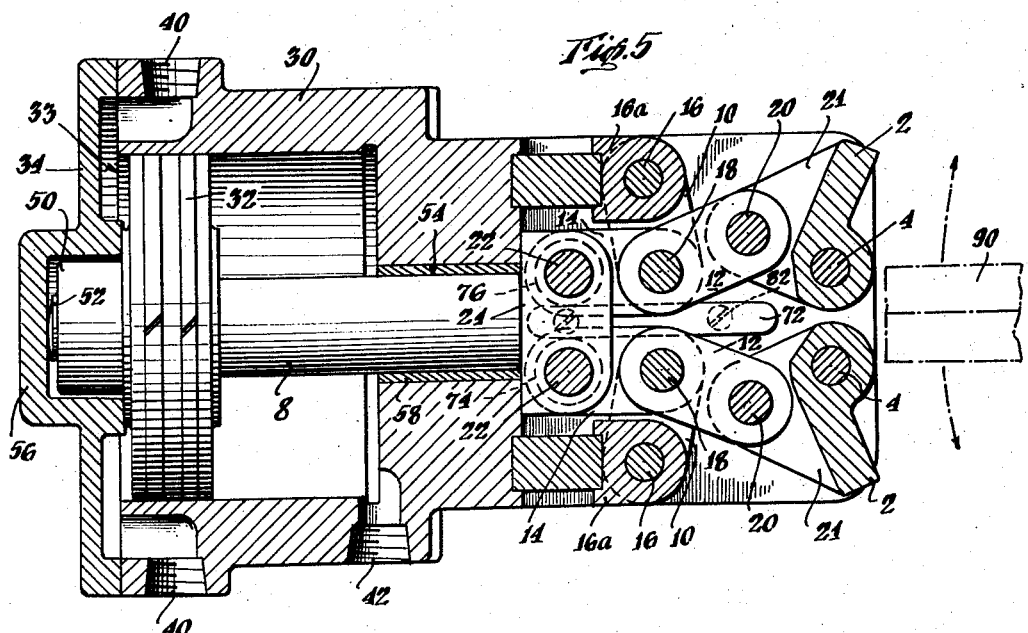
Fig. 5 is a central sectional view of the mold grab showing the jaws in their open position.

The actuating mechanism which moves the toggle arms 10 and 12 and the gripping jaws 2 is shown in Figs. 2, 3, and 5.

The actuating mechanism comprises the cylinder 30 and the piston 32 therein. The cylinder 30 is tubular in cross-section and has an open rear end 33 adapted to be closed by the rear cover 34. The cover 34 has flange 36 extending forwardly from its bottom for mounting the cylinder 30 on a base 38 in any desired or conventional manner. The openings 40 and the opening 42 are adapted to convey fluid or air under pressure to either side of the piston 32 in order to move the piston 32 within the cylinder 30. The openings 40 and 42 may be closed by the plugs 44 and 46, respectively, when the device is not in use.

The piston 32 is held on the piston rod 8 by means of the nut 50 threaded on to the threaded end 52 of the rod 8. The rod 8 protrudes through the opening 54 in the cylinder 30 and is attached to the links 14 and 14a through the intermediation of the flattened piston rod extension 24 and the pins or pivots 22. The nut 50 is adapted to enter the rearwardly directed extension 56 in the cover 34 when the piston 32 is in its rearward position. Packing 58 is provided in the opening 54 to make a tight seal with the piston rod 8 and to prevent leakage of the fluid.

When fluid under pressure enters through the openings 40, the piston 32 and rod 8 is pushed forward to close the jaws 2 through the intermediation of the links 14 and 14a and the toggle arms 10, 10a, 12, and 12a. When fluid under pressure enters the cylinder through the port 42, the piston 32 and rod 8 are pushed to the rear of the cylinder 30 and the jaws 2 are opened.

Toggle and jaw construction

The toggles are encased in a casing or frame comprising a top plate 60 and a bottom plate 62 which are attached to the cylinder 30 in any conventional or desired manner, such as by means of the bolts 64. Side plates (not shown) may also be provided to enclose the toggles and jaws.

In order to guide the piston-rod extension 24 during its reciprocation by the piston rod 8 as the jaws 2 are opened and closed, elongated piston rod guiding bearings 70 and 72 are provided adjacent to the toggles. Guide rollers 74 and 76 (Figs. 1 and 5) mounted on the pins 22 on the piston rod extension 24 engage opposite sides of the guiding bearings 70 and 72. The bearings 70 and 72 protrude through elongated apertures 78 and 80 in the top and bottom plates 60 and 62, respectively, and are held in place by bearing mounting plates 66 and 68 which are screwed to the plates 60 and 62 by screws 82.

The gripping jaws 2 are pivotally journalled on the pins or pivots 4 and are held in place by means of the nuts 84 threaded on the threaded ends 5 of the reduced portions 4a of the pivots 4. The jaws 2 are elongated and have the pair of arms 21 and 21a extending from their bottom and top portions, respectively.

The toggle arms 12 and 12a are pivotally mounted at one end on the pins or pivots 20 intermediate the arms 21 and 21a. The other ends of the toggle arms 12 and 12a are journalled on the floating pins or pivots 18.

Figure 1:
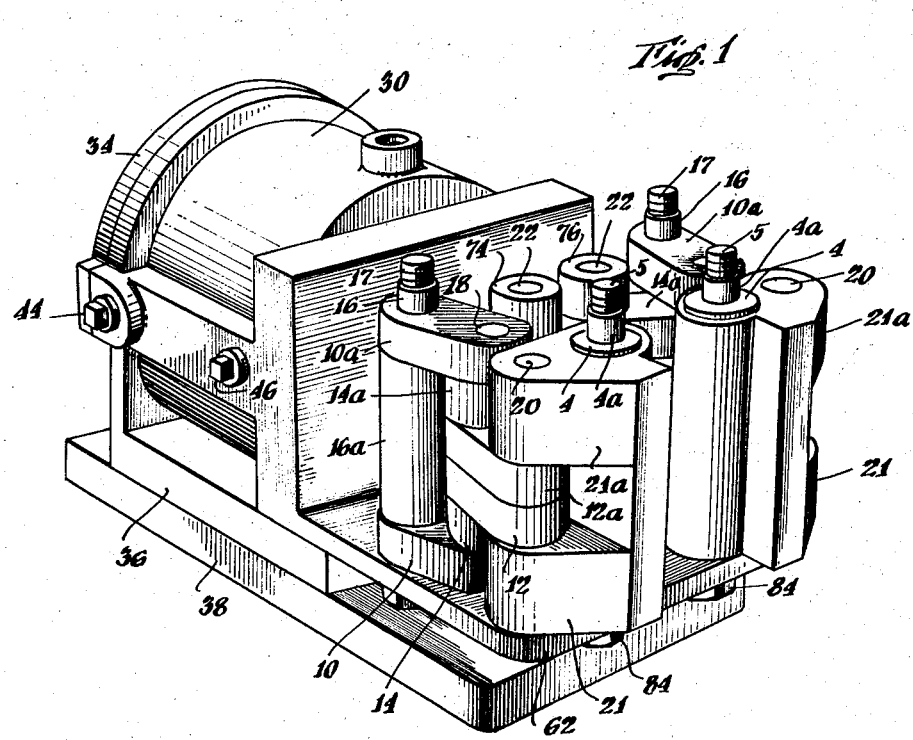
Fig. 1 is a perspective view of the mold grab with the top plate removed showing the gripping jaws in their closed gripping position.

The pair of toggle arms 10 and 10a are journalled at one end to the stationary pivots 16 in spaced relation to each other by means of the sleeves 16a and are held therein by means of the nuts 86 threaded on the threaded ends 17 of the pivots 16. The other ends of the toggle arms 10 and 10a are journalled on the floating pins or pivots 18 in spaced relation to the toggle arms 12 and 12a (Figs. 1 and 4).

The toggle arms 10 and 10a and the toggle arms 12 and 12a are connected to and operated by the piston rod 8 through the intermediation of the links 14 and 14a. The links 14 and 14a are pivotally mounted at one end to the pins or pivots 22 on the piston rod extension 24 of the piston rod 8. At their other ends, the links 14 and 14a are connected to the floating pins or pivots 18 intermediate the toggle arms 12, 12a and the toggle arms 10, 10a (Figs. 1 and 4). The pivots 22 are provided with the rollers 74 and 76 at their upper and lower ends to bear against the bearings 70 and 72 in order to permit the piston rod 8 to reciprocate smoothly.

Operation

The gripping jaws 2 are initially in the open position shown in Fig. 5. In this position the piston 32 together with the rod 8 is in the retracted position shown and the toggle arms 10, 10a and 12, 12a are in the angled position shown in Fig. 5.

When it is desired to clamp the halves of a split mold, such as 90, air under pressure is admitted into the cylinder 30 on the rearward side of piston 32 through the openings 40. This pushes the piston 32 and the rod 8 forward and, through the intermediation of links 14 and 14a and toggle arms 10, 10a, 12, the jaws 2 are closed on the mold halves 90.

Figure 9:
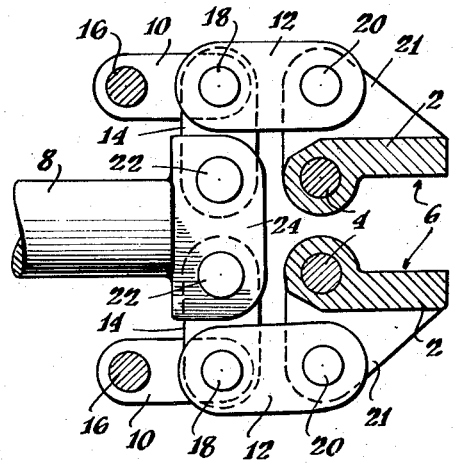
Fig. 9 is a horizontal sectional view similar to Fig. 6 showing the gripping jaws in their closed position.

When the rod 8 is pushed forward by the piston 32, the links 14 and 14a push the toggle joints or floating pivots 18 outwardly away from the axis of rod 8 and the toggle arms 10, 10a and 12, 12a assume the straight-line position shown in Figs. 2 and 9. The toggles 12 and 12a move forward as they assume the straight-line position and exert force on the arms 21 of the jaws 2 to rotate the jaws 2 to the closed gripping position.

When the mold 90 is to be released, fluid or air under pressure is admitted into the cylinder 30 on the front-side of the piston 32 through the opening 42. This retracts the piston 32 and the rod 8 and reverses the above-described closing operation. Thus, the links 14 and 14a pull the toggle joints 18 inwardly to the angled position shown in Figs. 5 and 6, to retract the toggle arms 12 and 12a which in turn rotates the jaws 2 to the open position.

When the toggles are moving from the angled position to the straight-line position and they reach the position shown in Fig. 8, the force necessary to place the toggles in a straight-line position slows down the operation, so that the jaws 2 clamp the mold 90 smoothly. This smoothness is enhanced by the presence of the rollers 74 and 76 on the pivots 22 which bear against the bearings 70 and 72 to enable the piston rod 8 to reciprocate smoothly.

It will be seen from the above description that a mold grab has been provided with improved features. The jaws of the mold grab are pivoted about a fixed pivot so that the mold grab engages the mold with a pure gripping or closing action and with no tendency to move the mold on its mounting during the closing action. As is indicated in Fig. 2, the jaws 2 tightly grip the two sides of the mold indicated at 90 to squeeze them together with great force. While this squeezing is being done, it is desirable that the closing action of the jaws 2 be confined to a squeezing motion as the mold 90 must remain accurately aligned otherwise with respect to other portions of the molding means which are cooperating with the mold 90 to produce an accurately molded product. The fixed pivots 4 on the mold grab frame and mounting the jaws 2 insure that the jaw closing action is confined to the desired rotary motion. The closing mechanism linking the jaws 2 and the piston rod 8 provides a rotary driving force for the jaws 2 which is of enormous power and which is thus capable of closing the mold halves so tightly together that the molded products are formed with only a negligible line or ridge which indicates that they have been formed in a split mold. This enormous closing force results from the novel toggle arrangement described above. Thus, each jaw 2 is rotated from its open to its closed position by a toggle having one arm pivotally connected to it and having its other arm mounted on a fixed pivot 16. These jaw closing toggles 10, 12 and 10a, 12a are simultaneously moved to open or close the jaws 2 by a cross toggle comprising the links 14, each of which is pivotally connected at one end to the piston rod extension 24 and at its opposite end to the pivot 18 of one jaw closing toggle. The links 14 thus provide a cross toggle which acts to multiply the closing force of piston 8 by the toggle action of links 14. The toggle action of the jaw closing toggles 10, 12 and 10a, 12a further multiplies the piston force so that a double toggle action is applied to the jaws 2 in a smooth and controlled jaw closing action.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a mold grab for gripping a split mold, the combination of a frame, a pair of gripping jaws mounted on said frame for pivotal movement on stationary pivots, actuating means for moving said jaws from an open position disengaged from the mold portions to a closed gripping position engaging the split mold portions, each of said jaws having one end of a first toggle arm pivotally mounted thereon, the other end of each of said first toggle arms being mounted on a floating pivot, each of said floating pivots having one end of a second toggle arm mounted thereon, the other end of each of said second toggle arms being mounted on a fixed pivot, and means connecting said actuating means to each of said floating pivots.

2. In a mold grab for gripping a split mold, the combination of a frame, a pair of gripping jaws on said frame for pivotal movement on stationary pivots, actuating means for moving said jaws from an open position disengaged from the mold portion to a closed gripping position engaging the split mold portions, each of said jaws having one end of a first toggle arm pivotally mounted thereon, the other end of each of said first toggle arm being mounted on a floating pivot, said floating pivot having one end of a second toggle arm mounted thereon, the other end of each of said second toggle arms being mounted on a fixed pivot, and each of said floating pivots having one end of a third toggle arm pivotally mounted thereon, said third toggle arms having their other ends mounted on said actuating means.

3. In a mold grab for gripping a split mold, the combination of a frame, a pair of gripping jaws mounted on said frame for pivotal movement on spaced stationary pivots, actuating means for moving said jaws from an open position disengaged from the split mold portion to a closed gripping position engaging the split mold portions, a toggle for each of said jaws, said toggle having one end mounted on a pivot on said jaws and its other end mounted on a stationary pivot on said frame, said actuating means being connected to said toggle on a floating pivot intermediate its ends, and said jaws being in spaced relation to each other when in said closed position.

4. In a mold grab for gripping a split mold, the combination of a frame, a pair of gripping jaws mounted on said frame for pivotal movement on spaced stationary pivots, actuating means for moving said jaws from an open position disengaged from the mold portions to a closed gripping position engaging the split mold portions, a jaw closing toggle for each of said jaws, comprising a first arm having one end mounted on a pivot on said jaws and its other end mounted on a floating pivot, a second arm having one end mounted on said floating pivot and its other end mounted on a stationary pivot on said frame, and a link pivotally mounted at one end to said actuating means and having its other end connected to said floating pivot, whereby said jaws are in spaced relation to each other when in said closed position.

5. A mold grab as claimed in claim 4, wherein said actuating means comprises reciprocating means and includes guide means mounted on said frame for guiding said actuating means.

References Cited in the file of this patent
UNITED STATES PATENTS

| | | |
|---|---|---|
| 1,317,049 | Smith | Sept. 23, 1919 |
| 1,421,065 | Callan | June 27, 1922 |
| 1,534,878 | Stenhouse | Apr. 21, 1925 |
| 1,564,001 | Krell | Dec. 1, 1925 |
| 1,666,621 | Greenwood | Apr. 17, 1928 |
| 1,666,732 | Brophy | Apr. 17, 1928 |
| 1,726,521 | Davis | Aug. 27, 1929 |
| 1,822,501 | Onsrud | Sept. 8, 1931 |
| 1,974,841 | Allen | Sept. 25, 1934 |
| 2,341,602 | Dewey | Feb. 15, 1944 |
| 2,378,176 | Bert | June 12, 1945 |
| 2,538,822 | Winder | Jan. 23, 1951 |
| 2,743,631 | MacChesney | May 1, 1956 |
| 2,748,536 | Allen (II) | June 5, 1956 |

FOREIGN PATENTS

| | | |
|---|---|---|
| 512,082 | Germany | of 1930 |